United States Patent [19]
Ardezzone et al.

[11] 3,848,188
[45] Nov. 12, 1974

[54] MULTIPLEXER CONTROL SYSTEM FOR A MULTI-ARRAY TEST PROBE ASSEMBLY

[75] Inventors: Frank J. Ardezzone, Santa Clara; Milton M. Silverstein, San Jose, both of Calif.

[73] Assignee: Probe Rite, Inc., Santa Clara, Calif.

[22] Filed: Sept. 10, 1973

[21] Appl. No.: 395,978

[52] U.S. Cl............................ 324/73 AT, 340/183
[51] Int. Cl............................................ G01r 17/12
[58] Field of Search...................... 179/15 A, 15 BF; 340/149 R, 150, 155, 183, 413; 324/73 AT, 158 P, 73 R; 318/562

[56] References Cited
UNITED STATES PATENTS

| | | |
|---|---|---|
| 3,238,455 | 3/1966 | Jankowski ...................... 324/73 AT |
| 3,597,682 | 8/1971 | Hubbs ............................ 324/73 AT |
| 3,665,439 | 5/1972 | Brummer ........................... 340/183 |

*Primary Examiner*—Ralph D. Blakeslee
*Attorney, Agent, or Firm*—Schatzel & Hamrick

[57] ABSTRACT

A multiplexer control system for a multi-array test probe assembly for controlling the simultaneous interface contact of the probe arrays with a plurality of electronic devices and the successive interconnection of said arrays with electronic test equipment.

10 Claims, 5 Drawing Figures

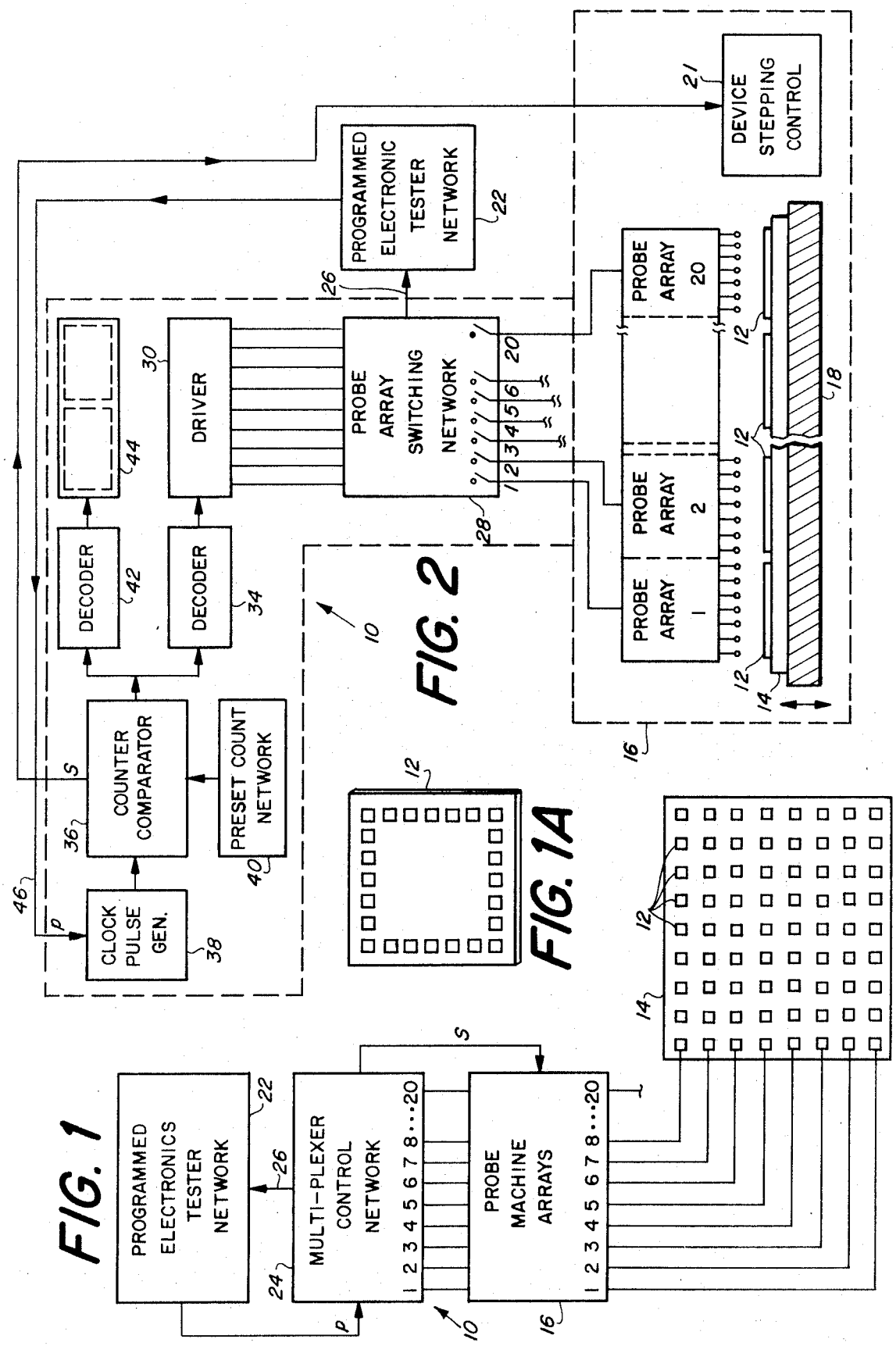

3,848,188

MULTIPLEXER CONTROL SYSTEM FOR A MULTI-ARRAY TEST PROBE ASSEMBLY

BACKGROUND OF THE INVENTION

1. Field of the Invention

The present invention relates generally to test probe systems for making electro-mechanical interface contact with the terminals of miniature electronic devices of which the electrical characteristics are to be tested and more particularly to a multiplex control test probe system whereby a plurality of devices may be simultaneously positioned in interface contact with test probe arrays of a probe head apparatus and the individual devices tested successively while in position.

2. DESCRIPTION OF THE PRIOR ART

The practice of testing electrical characteristics of miniature electronic devices, e.g. semiconductor components, integrated circuits, components, circuits, etc., is of prime importance to the electronic device manufacture so as to discover the performance capabilities of devices prior to and after assembly. For example, in the semiconductor industry it is desirable to test semiconductor devices while in wafer or slice form so as to eliminate unsatisfactory components prior to assembly. The manufacturer further tests the devices after final assembly and prior to shipment for quality assurance. The end user of the devices commonly tests the devices prior to installation in equipment of which the devices become a part. Increasing demand for miniature electronic devices further dictates that there be continuing emphasis placed on the electronic industry to provide equipment capable of performing these tests at higher rates of speed with precise accuracy.

Electronic industry developments continues the further miniaturization of electronic devices. This in turn dictates that in the testing operations of semiconductor-type devices, it is desirable and necessary to simultaneously test more and more devices positioned on a wafer and more and more pads positioned on the device. The high volume demand and the continuing further miniaturization of devices require smaller pads precisely positioned to one another. For example, presently pads of four mil square are commonly used. Pads of two mil square and pads of two mil diameter with one mil space between adjacent pads are becoming more widely used.

Multi-probe head assemblies have been commonly used to provide electro-mechanical interface contact of the terminal pads of devices with electronic test equipment. The interface probe head assembly need provide a large number of probe contacts of small size with dimensionally accurate position to provide for the simultaneous interface contact of a large number of pads of a device with the test equipment during the testing procedures. Various electronic devices carry pads of extremely thin layers of metal and demand extreme care during the interface contact of the pads with the probe contacts to avoid damage to the pads. Thus, the prevention of damage by the probe contacts to the metallized pads of the devices during the interface electro-mechanical contact is a prime objective.

Probe head assemblies are mounted on machines commonly referred to as a wafer probing machine. The machine supports the probe head and includes provisions for electrically interconnecting the probe head with electronic test equipment. The machine also includes a receiving station for positioning the devices relative to the probe head tip contacts. Responsive to command signals, the machine brings the device in interface contact with the device to complete the electrical circuit of the device with the test equipment. The testing operations include positioning a wafer or other electronic device to be tested on the chuck of the machine. The machine guides the probe tip contacts relative to the pads to make the interface engagement. Upon making the interface contact, the electronic test equipment senses and evaluates the electrical characteristics of the device. The test equipment may be programmed to compare the characteristics relative to programmed standards. When the testing is complete, the device is removed from contact with the probe tips, the tested device is moved on (stepped) relative to the probe head assembly and another device is placed in position. The procedure is then repeated for the "new" device.

Probe heads assume various designs depending upon the format of the pads of the devices to be tested. The design may include various numbers of contact tips arranged in various formats. Probe heads and probing machines are designed such that probe heads may be interchanged. This permits the probing machine to be used in testing of electronic devices of various configurations merely by changing the probe head assembly.

In practice, it is common for a single wafer to carry a plurality of devices in rows and columns and having similar pad formats. These devices may all be individually and successively tested by a probe head of one design. The wafer is stepped in incremental steps relative to the probe head with the number of steps coinciding with the number of devices. The same test probe head may also be used to test successive wafers carrying devices of the same pad configuration.

With heretofore systems the lapse time to complete the actual electrical tests is only a fraction of the time consumed in orienting the devices in position with the probe heads. To overcome the time consumption problem in part, there are some available systems whereby three probing machines, each carrying a probing head, are set up in operation by a programmed computer such that while one probing machine is in interface contact with a device, a second machine is in a state wherein the probe head is approaching interface contact with a second device and a third machine is in a condition wherein a third device is being positioned in alignment with the probe head of the third machine. As the electrical test is completed on the first machine, the electrical equipment is then switched over to the second machine at about the time the interface contact of the second machine with the second device is being completed. At the same time, a fourth device is being stepped towards the first machine and the third machine is in a position with the probe head approaching the third device. This procedure is repeatedly conducted. Though this arrangement has proven to conserve some time, it has proven to be economically expensive since three probing machines are required. Furthermore, a great deal of machine time is expended in conducting the mechanical operations properly aligning the individual devices. The expenditure of time results in a relatively inefficient use of the computer and electronic test equipment. It also limits the test time efficiency of the individual probing machines when the number of devices tested by the individual machine are compared to the amount of time utilized. This system also requires a considerable number of mechanical operations which results in wear on the mechanical equipment. As a result thereof, there is need for test systems capable of testing more devices in a given period of time and at less cost.

The state of the art is described in a publication entitled: "Probing Techniques: Evolution, Practices and Predictions" copyrighted in 1972 and plublished by the Assignee of the present invention.

SUMMARY OF THE PRESENT INVENTION

A primary object of the present invention is to provide a multiplex test probe system capable of more efficiently testing electronic devices.

Another object is to provide a multiplex test probe system wherein a plurality of individual devices may be simultaneously positioned in interface contact with a plurality of test probe arrays on a single wafer probing machine and the interconnected test equipment then successively stepped from device-to-device without the need of any mechanical movement of the devices intermediate the testing of individual devices.

In the exemplary embodiment, a probe head assembly comprising a plurality of individual probe arrays is provided in alignment relative to one another. The probe head assembly is such that as a wafer carrying a plurality of devices in a pattern is positioned, the individual devices in the pattern are placed in alignment with a head array and each pad of each oriented device is in alignment with a tip contact. Once in position, all of the probe arrays are positioned in unison in interface contact with their respectively aligned devices.

The probe arrays are electrically engaged to a switching network intermediate the electronic testing equipment. Once in interface contact, the probe arrays are successively electrically interconnected with the test equipment responsive to command signals provided to the switching network. The command signals are provided to the switching network from a driver which is in turn responsive to programmed signals. The programmed signals are generated responsive to a preset program and a time reference signal. The preset program is established responsive to the number of devices to be simultaneously interfaced and the tests to be performed on each device. The time reference, which may be generated by the test equipment, by a clock reference or manually, establishes the test time for which the arrays are in interface contact.

As a result thereof, there is provided a system wherein a plurality of devices may be simultaneously positioned physically and then, while in position, successively tested electrically using the same electronic test equipment and the same probing machine. This provides a system which improves the time efficiency of testing miniature electronic devices and also provides a system wherein the mechanical wear and expense of mechanical equipment is decreased relative to that of heretofore systems.

These and other objects and advantages of the invention will become apparent to those of ordinary skill in the art after having read the following detailed description of the preferred embodiment which is illustrated in the several figures of the drawings.

BRIEF DESCRIPTION OF THE DRAWINGS

FIG. 1 is a simplified block diagram of the system of the present invention diagrammatically illustrating the probe machine in interface contact with a plurality of devices carried by a segment of a wafer;

FIG. 1a illustrates an enlarged view of the pad format of a device of the wafer of FIG. 1;

FIG. 2 illustrates a block diagram of the system of FIG. 1;

DESCRIPTION OF THE PREFERRED EMBODIMENT

Figure 3:
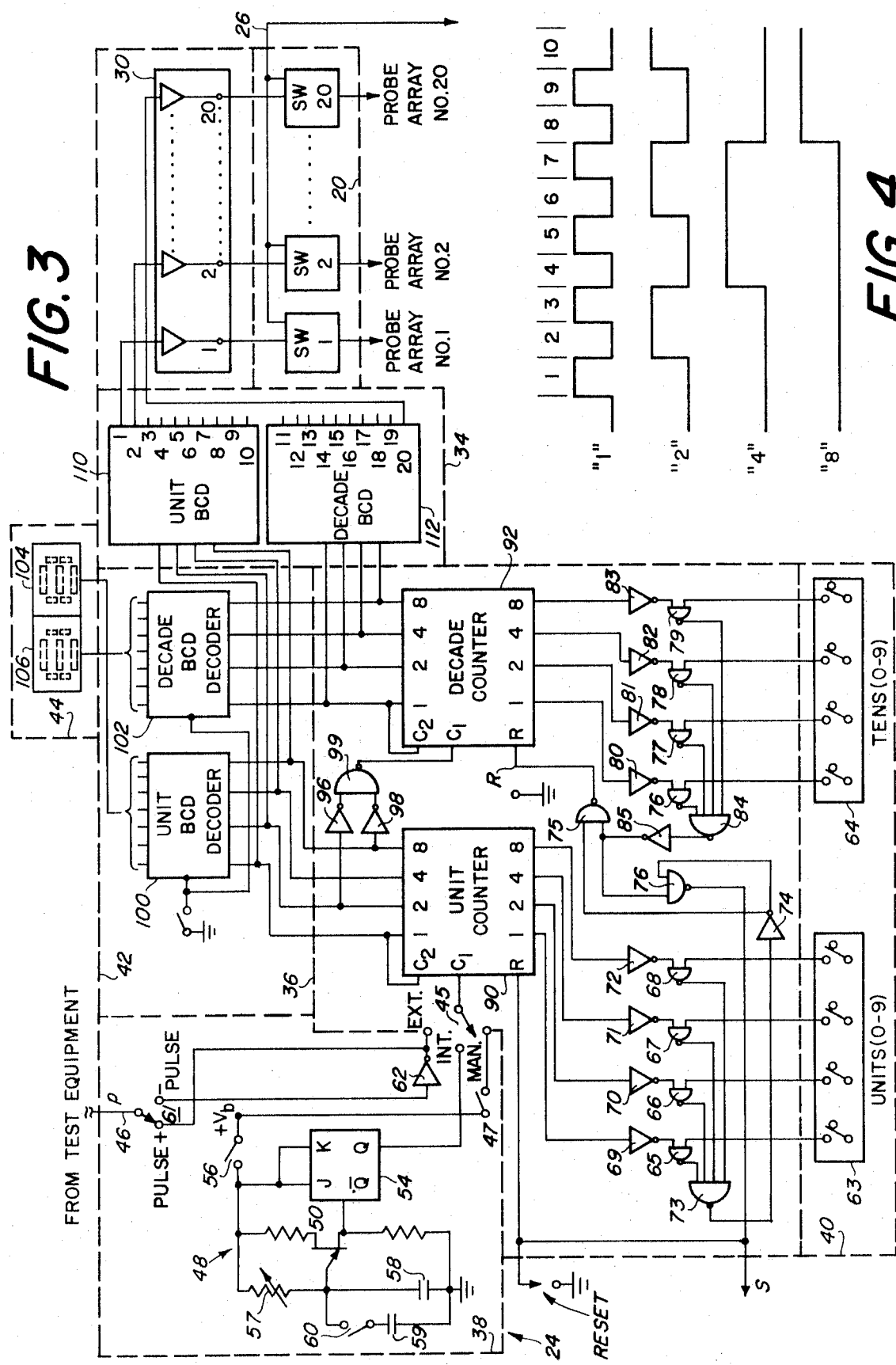
FIG. 3 illustrates a logic block diagram of the multiplexer control unit of the apparatus of FIGS. 1 and 2.

The drawings illustrate a multi-probe array multiplexer system, referred to by the general reference character 10, for testing miniature electronic devices 12 carried by a semiconductor wafer 14. The devices 12 are generally aligned in rows and columns on the wafer, which commonly assumes a nonuniform circular shape. The number of devices per row and columns is dependent upon the size and shape of the wafer 14 and the size and shape of the devices 12. For illustrative purposes, the devices 12 are illustrated of rectangular form with 24 pads arranged about the periphery. FIG. 1a illustrates an enlarged view of the device 12 and the pads positioned thereon.

The system 10 includes a wafer probing machine 16 carrying a plurality of probe arrays. Each array is adapted for testing a device 12 and carries 24 tip contacts in a rectangular pattern to make interface contact with each pad on each device. The illustrated probe machine 16 carries 20 probe arrays, each having 24 tip contacts. The probe arrays are ganged in common such that they may be used in unison to make interface contact with a maximum of 20 aligned devices simultaneously. The arrays are mounted in spaced apart alignment to correspond to a row of devices on the wafer. Through 20 arrays are diagrammatically illustrated, the number of arrays may vary depending on the application. Furthermore, as it will hereinafter become readily apparent, it is not necessary to use all the head arrays available. For example, though 20 arrays are illustrated, any number of aligned devices may be accommodated. The probing machine 16 includes a chuck 18 on which the wafer 14 is supported (see FIG. 2). The chuck 18 is in alignment with the probe arrays such that when the chuck is elevated, it urges the devices in interface contact with the probe head arrays. Wafer 14 may be stepped laterally across the chuck 18 in response to a device stepping control 21 such that after completion of the electrical tests of the devices in a given row, the chuck 18 is lowered and the wafer stepped to bring another row of devices in alignment with the probe arrays.

The tester network 22 is coupled to the probing machine 16 through a multiplexer control network 24. The tester network is engaged to the multiplexer control network 24 through a cable 26. The multiplexer network 24 interconnects the tester responsive to the conditions of a probe array switching network 28. The switching network 28 successively interconnects the individual probe arrays to the cable 26 responsive to command signals from a driver network 30. Driver 30 provides command signals dictating the condition of the switching network 28 and which head array is interconnected to the cable 26. For example, since in the illustrated embodiment, there are 20 head array, the driver provides up to 20 distinct successive signals so as to actuate the proper switch to interconnect line 26 with the proper array.

Thus, in operation, the multiplexer 24 is such that the probe arrays are switched in successive steps while all are simultaneously in contact with their respectively aligned devices. To generate the command signals, the driver 30 is tied to a decoder 34 which is in turn tied to a counter-comparator 36. Inputs to the counter-comparator 36 extend to a clock pulse generator 38, and a preset count network 40. The counter-comparator is also tied to a decoder 42 in turn extending to a visual readout 44 to visually depict the status of the tests. The counter-comparator 36 is also interconnected with the device stepping control 22.

Using the wafer 14 as an example, the devices 12 are arranged in rows of eight devices per row. The number of devices in a row establishes the count to be set up in the preset count network 40. Accordingly, the number "eight" is set by the operator in the preset count network 40 this establishes the program base reference on which the multiplexer responds. More precisely, the program base reference establishes the number of clock pulse generator counts before a step command signal "s" is generated to the feeder 22 to cause physical shifting of the wafer and bringing a new row of devices into alignment with the probe head arrays of the probing machine 16.

The counter-comparator 36 also responds to the output of the clock pulse generator 38 which establishes the time period between successive counts and thus the time in which each probe array is interconnected to the line 26 and tester network 22. As hereinafter further described, the clock pulses may originate from an internal counter, the tester network or manually. The counter-comparator 36 compares the number of clock pulses during a cycle with the preset count of the network 40. When the comparative count indicates that the last device in the row has been tested, the counter provides a step signal "s" to the feeder 22. In response to the step signal, the wafer 18 is lowered to break the interface contact of the row of devices with the probe arrays, and the feeder steps the wafer to a new position to align another row of devices on the chuck 18 in alignment with the probe arrays No. 1– No. 8. Counter-comparator 36 also generates binary signals indicative of each count of each cycle. The binary signals are received by the decoders 42 and 34. The decoder 42 is tied to a digital readout which visually indicates a continuous running account of the number of devices which have been tested in the given wafer position. For the illustrated embodiment, since there are eight devices per row, the readout 44 will successively indicate the numerals one through eight for each wafer position. The depicted numeral will coincide with the number of probe arrays No. 1– No. 8 interconnected to the testor network 22 at that precise moment. Decoder 34 converts the binary count to digital signals in decimal form which are provided to the driver 30. In the illustrated embodiment there are 20 different switch positions in the switching network 28 and thus potentially 20 different command signals from the driver 30. However, in the present illustrated embodiment, since the preset counter is set to "eight," command signals will only be delivered to the first eight switches No. 1–No. 8 before the step signal "s" is generated and the system recycled. Thus, during a cycle, the switches No. 1– No. 8 and probe arrays No. 1–No. 8 are successively actuated responsive to the comparative counts. Simultaneously, the electronic test equipment tests the device in interface contact with the probe array coupled through the switch network 28 to line 26.

FIG. 3 illustrates a logic circuit for the multiplexer control network. The clock pulse generator 38 is adapted to generate clock signals based on an automatic internal clock, a clock signal from the electronic tester network or manual commands. The illustrated clock 48 includes a unijunction transistor 50 of which the emitter is tied to a switch 52. One of the basis is tied to the clock input of a flip-flop 54. The output of the flip-flop is tied to the switch 45. The flip-flop 54 is also tied to a on/off switch 56 extending to a voltage supply Vd. Switch 56 is also tied to the other base of the transistor 50 and to a variable resistor 47. Resistor 57 extends to the emitter of the transistor 50. A first capacitor 58 is tied across the emitter and ground reference in parallel with a capacitor 59 through a switch 50. Thus, with the switch 56 in the closed position, the clock 48 runs in a continuous mode so as to provide a continuous train of pulses. The resistance-capacitance time constant and thus time period of the pulses is determined by the resistance 57 and capacitors 58 and 59. The switch 50 permits the selection of a high or low range. With switch 69 closed, a slower range is realized relative to that when the switch is open and thus removing capacitor 59 from the circuit. Variable resistor 57 permits viewer adjustments in the pulse timing.

If the external clock is to be used the switch 45 is placed in the "EXT." position. A two position switch 61 interconnects the line 46 with the switch 45. The external clock pulse "p" from the test equipment may be either positive or negative. In the illustrated embodiment it is desirable to have positive clock pulse so that the ($t$) side of switch 61 is tied directly to the switch 45. The (—) side is tied to the input of an inverter 62 in series with the switch 45. In operation, switch 45 is positioned to "EXT" and switch 61 either (+) or (—) depending on the pulse "$p$" source. The pulse "$p$" is generated for each successive test of a device by the probe arrays No. 1–No. 8.

In the event it is desirable to manually generate the clock, the switch 45 is placed in the "MAN" position. The pulse switch 47, which interconnects $V_b$ to the switch 45 may be actuated. A three position switch 45 is positioned to interconnect the counter-comparator 36 to an interconnect line 46 extending to the test network 22, to a manual single pulse switch 47 or to an internal automatic clock 48.

The present count network 40 includes a plurality of the binary units switches 63 and a plurality of decade switches 64. The units 63 and 64 may be preset according to the number of devices to be tested in a given row. For example, in the illustrated embodiment, the switches 63 would be set to provide a binary eight and the switches 64 set to provide a binary zero. The switches 63 and 64 extend to the comparator portion of the counter-comparator 36. The four terminals of the switch 63 extend to NAND gates 65, 66, 67 and 68. A set of inverters 69, 70, 71 and 72 are respectively tied to the other side of the NAND gates 65–68. The outputs of the gates 65–68 are all tied to the input of a NAND gate 73. The output of the gate 73 is tied to an inverter 74, the output of which is tied to NAND gates 75 and 76. The binary outputs of the tens switch assembly 64 are tied to a plurality of NAND gates 76, 77, 78 and 79. The other input terminals of the gates 76–79 are respectively tied to a set of inverters 80–83. The output of the gates 76–79 all extend to a NAND gate 84, the output of which is tied to an inverter 85 extending to the input of the NAND gate 75.

Figure 4:
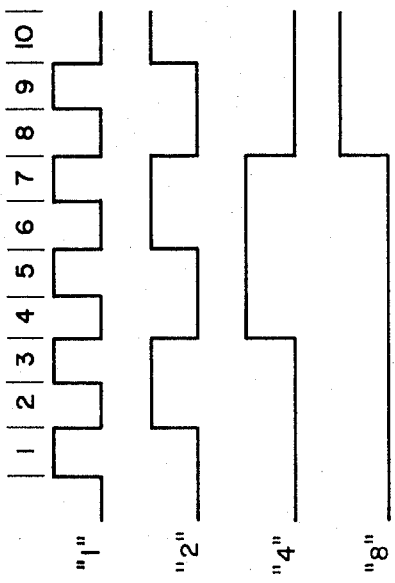
FIG. 4 illustrates signal wave forms of the binary signals from the counters of the mulitplexer of FIG. 3.

The counter portion of the counter-comparator 36 includes a BCD unit counter 90 and a BCD decade counter 92. The clock signals from the clock pulse generator 38 are received at the clock input terminal C1. The counter counts the number of clock pulses and provides the count in binary form at the output terminals. The count output is received by the invertors 69–72, inverted and then appears on the input of the NAND gates 65–68. When the count corresponds to the preset count, the NAND gate 73 provides an output signal. If the decade count of counter 92 also corresponds to the preset "tens" count the NAND gate 84 also provides an output signal. This in turn causes NAND gates 75 and 76 to conduct thereby resetting each of the counters 90 and 92. Also, the control signal "s" is generated to cause a stepping of the wafer 14 and another count.

Where the preset count is greater than "nine" it is necessary that the decade counter 92 generate indications as to the decade. Thus, the clock input "C1" of the counter 92 responds to the counter 90. An inverter 96 is tied to the binary "two" output terminal of the counter 90 and an inverter 98 to the binary "eight" output terminal. The inverters 96 and 98 are in turn tied to the input of a NAND gate 99 extending to the terminal C1. As illustrated in FIG. 4, during successive counts, the signals at the output terminals "1," "2," "4" and "8" appear between two levels. At the binary "ten," the signals on both the "2" and the "8" terminals are positive. Thus, at binary ten, the NAND gate 99 produces an output clock pulse. The counter 92 counts on the negative going trailing edge of the pulse on the gate 99. Thus, at the instant the binary ten appears, the clock pulses on counter 92 is received and counted and upon conclusion of the pulse the counters are reset.

The decoder 42 includes a pair of BCD decoders 100 and 102 with the decoder 100 receiving the binary output signals from the counter 90 and the decoder 92. The decoders 100 and 102 convert the binary signals to diode logic decimal signals at the output. The logic decimal signals from the decoder 100 are tied to a unit readout display 104 of the readout display unit 44. The diode logic output of the decoder 102 is received by a tens unit display 106 of the readout 44.

The decoder 34 includes a pair of BCD decoders 110 and 112 respectively joined to the output of the counters 90 and 92. The decoder units 34 respond to the binary signals of the unit counter 90 and the decade counter 92 converts the binary signals to decimal signals at their output. For example, in the illustrated embodiment where 20 probe arrays are to be accommodated, the decoder 34 provides 20 digital output signals each of which is indicative of a decimal number between 1 and 20.

The output from the decoder units 110 and 112 are received by the driver network 30 which is in the form of a plurality of individual power amplifiers. In this embodiment 20 amplifiers are provided. Each of the power amplifiers are interconnected to one of the outputs of the decoder 34 so as to amplify the decimal form pulse to a level capable of operating an associated switch No. 1–No. 20 in the switching network 28. In the switching network 28 there is a plurality of 20 individual switches each of which is tied to the line 26 and each of which is individually joined to one of the outputs of the power amplifiers and the driver network 30. Preferably the switches No. 1–No. 20 are electrically insulated from the cable 26 so as not to electrically interfere with the test signals. It should be noted that switches No. 1–No. 20 can be of as many poles as required by the device under test and more particularly as described in the text and example is of 24 poles.

What is claimed is:

1. A multiplexer control system for controlling the interconnection of electronic test equipment with a multiple of electronic test probe arrays comprising, in combination:

an electronic device probing station for receiving a multiple of miniature electronic devices to be tested, a probe head assembly of a plurality of individual probe arrays, each of said arrays being arranged in a common pattern compatible with the pad pattern of the devices to be tested, and a device stepping control for controlling the positioning of devices relative to said arrays;

a multiplexer control signal generator means interconnected with said device stepping control and including a stepping switch for individual interconnection of each of said individual probe arrays with a terminal means for interconnection with electronic test equipment, said multiplexer signal generator means being adapted for generating control signals to said stepper switch and to said device stepping control responsive to the number of devices aligned for simultaneous interface contact with the probe arrays, said control signals including a first command signal to the stepping control to control alignment of a set of devices relative to the probe arrays and interface contact of said aligned devices with said probe arrays and a second command signal train for successively actuating said stepping switch to provide successive interconnection of the individual arrays with said electronic test equipment.

2. The multiplexer control system of claim 1 wherein the multiplexer control signal generator includes a clock pulse generator means of a select time period for establishing the time period between successive second command signals.

3. The multiplexer control system of claim 2 wherein the multiplexer control signal generator includes a preset count network for establishing the number of second command signals intermediate successive first command signals.

4. The multiplexer control system of claim 3 wherein the multiplexer control signal generator includes a counter-comparator network interconnected with said clock pulse generator and said preset count network, the counter-comparator being preset by said preset count network and counting successive count pulses, said counter-comparator generating said first command signals each time the count corresponds to the preset count.

5. The multiplexer control system of claim 4 wherein the counter-comparator generates binary code numbers for each clock count, and the multiplexer control signal generator includes a first decoder means for decoding said binary code numbers and generating responsive second command signals in digital form to said stepper switch.

6. The multiplexer control system of claim 5 wherein the multiplexer control signal generator includes a digital readout means interconnected with said counter-comparator to provide a readout of successive second command signals intermediate successive first command signals.

7. A multiplexer control system of claim 5 wherein the multiplexer control signal generator includes a driver amplifier network intermediate the first decoder means and said stepper switch to amplify said digital signals and generate responsive second command signals.

8. The multiplexer control system of claim 5 wherein the multiplexer control signal generator includes terminal means for receiving an external clock pulse source, said counter-comparator being adapted to count successive pulses of said external clock.

9. The multiplexer control system of claim 5 wherein the multiplexer control signal generator includes means for resetting said counter-comparator upon the generation of each first command signal.

10. The multiplexer control system of claim 9 wherein the multiplexer control signal generator including manual pulsing means for manually generating clock signals to the counter-comparator.

* * * * *